(12) United States Patent
Maver

(10) Patent No.: US 11,097,832 B2
(45) Date of Patent: Aug. 24, 2021

(54) DUAL ACTUATOR HYDRAULIC PITCH-LOCK PROPELLER SYSTEM

(71) Applicant: Hamilton Sundstrand Corporation, Charlotte, NC (US)

(72) Inventor: Timothy Maver, Glastonbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 164 days.

(21) Appl. No.: 16/566,023

(22) Filed: Sep. 10, 2019

(65) Prior Publication Data

US 2021/0070425 A1  Mar. 11, 2021

(51) Int. Cl.
*B64C 11/38* (2006.01)
*B64C 11/44* (2006.01)

(52) U.S. Cl.
CPC ............ *B64C 11/38* (2013.01); *B64C 11/385* (2013.01); *B64C 11/44* (2013.01)

(58) Field of Classification Search
CPC ....... B64C 11/38; B64C 11/385; B64C 11/44; F15B 2211/30505
See application file for complete search history.

(56) References Cited

U.S. PATENT DOCUMENTS

| | | | |
|---|---|---|---|
| 2,980,188 A | 4/1961 | Allen, Jr. et al. | |
| 3,689,103 A * | 9/1972 | Meulendyk | B60G 17/04 280/5.513 |
| 4,591,313 A | 5/1986 | Miyatake et al. | |
| 5,174,718 A | 12/1992 | Lampeter et al. | |
| 6,261,062 B1 * | 7/2001 | Amerling | B63H 3/082 416/147 |
| 8,545,178 B2 | 10/2013 | Perkinson et al. | |
| 8,651,812 B2 | 2/2014 | Wilson et al. | |
| 8,757,975 B2 | 6/2014 | Swift et al. | |
| 8,851,849 B2 | 10/2014 | Swift et al. | |
| 2013/0081384 A1 * | 4/2013 | Opdenbosch | E02F 9/2296 60/327 |
| 2017/0313406 A1 * | 11/2017 | Lassalle | B64C 11/40 |
| 2019/0061916 A1 | 2/2019 | Maver | |

OTHER PUBLICATIONS

Extended European Search Report for EP Application No. 20195518.4, dated Feb. 2, 2021, pp. 1-10.

* cited by examiner

*Primary Examiner* — David Hamaoui
*Assistant Examiner* — Michael K. Reitz
(74) *Attorney, Agent, or Firm* — Cantor Colburn LLP

(57) ABSTRACT

A system is provided. The system includes a dual piston actuator and valves. The dual piston actuator includes a primary actuator and a protection actuator. The primary and protection actuators move to increase and decrease a pitch of propellers of an aircraft with respect to a supply of first and second mediums. The valves include a first check valve, a second check valve, and a third valve. The third valve operates between a first mode and a protection mode. The second medium is directed to the primary and protection actuators through the first and second check valves by the third valve when the third valve is operating in a protection mode.

16 Claims, 2 Drawing Sheets

DUAL ACTUATOR HYDRAULIC PITCH-LOCK PROPELLER SYSTEM

BACKGROUND

Exemplary embodiments pertain to the art of variable pitch propellers of aircrafts. Variable pitch propellers are required by certification authorities to demonstrate that no single failure (due to conventional redundancy designs for the variable pitch propellers) results in a pitch below an in-flight low pitch position. Conventional redundancy designs include mechanical pitch-lock mechanisms and counterweighted propeller blades. However, the mechanical pitch-lock mechanisms and the counterweighted propeller blades result in a significant amount of weight and system complexity for the aircraft.

BRIEF DESCRIPTION

In accordance with one or more embodiments, a system is provided. The system includes a dual piston actuator and valves. The dual piston actuator includes a primary actuator and a protection actuator. The primary and protection actuators move to increase and decrease a pitch of propellers of an aircraft with respect to a supply of first and second mediums\ The valves include a first check valve, a second check valve, and a third valve. The third valve operates between a first mode and a protection mode. The second medium is directed to the primary and protection actuators through the first and second check valves by the third valve when the third valve is operating in a protection mode In accordance with one or more embodiments or the system embodiment above, the protection mode can include a hydraulic pitch-lock condition with a capability to increase the pitch of the propellers.

In accordance with one or more embodiments or any of the system embodiments above, the first medium can include a hydraulic force used to decrease the pitch of the propellers.

In accordance with one or more embodiments or any of the system embodiments above, the second medium can include a hydraulic force used to increase the pitch of the propellers.

In accordance with one or more embodiments or any of the system embodiments above, a connection of the protection actuator can receive atmospheric pressure or the first medium.

In accordance with one or more embodiments or any of the system embodiments above, the third valve can include a solenoid operated valve that generates a controlled magnetic field that provides a force acting on the third valve.

In accordance with one or more embodiments or any of the system embodiments above, the third valve can include a biasing spring that selects that the protection mode during a power loss.

In accordance with one or more embodiments or any of the system embodiments above, the system can include a sensor that monitors the dual piston actuator for latent fault detection.

In accordance with one or more embodiments or any of the system embodiments above, the system can be incorporated into a rotating side of the propellers of the aircraft.

In accordance with one or more embodiments, a method is provided. The method includes operating a dual piston actuator in a first mode. The dual piston actuator includes a primary actuator and a protection actuator that move to increase and decrease a pitch of propellers of an aircraft with respect to a supply of first and second mediums. The method also includes detecting a control loss with respect to the second medium and operating the dual piston actuator in a protection mode where the second medium is directed to the primary and protection actuators through first and second check valves by a third valve.

In accordance with one or more embodiments or any of the method embodiments above, a sensor can monitor the dual piston actuator for the control loss.

In accordance with one or more embodiments or any of the method embodiments above, the protection mode can include a hydraulic pitch-lock condition with a capability to increase the pitch of the propellers of the aircraft.

In accordance with one or more embodiments or any of the method embodiments above, the primary and protection actuators can control the propellers of an aircraft in accordance with the supply of the first and second mediums and the first medium can include a hydraulic force used to decrease the pitch of the propellers.

In accordance with one or more embodiments or any of the method embodiments above, the primary and protection actuators can control the propellers of the aircraft in accordance with the supply of the first and second mediums and the second medium can include a hydraulic force used to increase the itch of the propellers.

In accordance with one or more embodiments or any of the method embodiments above, the third valve can include a solenoid operated valve that generates a controlled magnetic field that provides a force acting on the third valve.

In accordance with one or more embodiments or any of the method embodiments above, the third valve can include a biasing spring that selects that the protection mode during a power loss.

BRIEF DESCRIPTION OF THE DRAWINGS

The following descriptions should not be considered limiting in any way. With reference to the accompanying drawings, like elements are numbered alike.

DETAILED DESCRIPTION

Embodiments herein relate to a dual actuator hydraulic pitch-lock propeller system and operations thereof. Accordingly, embodiments herein provide a safe, certifiable, light weight, and simple design where no single failure or malfunction in a propeller system results in an unintended travel of propeller blades to a position below an in-flight low-pitch position.

Figure 1:
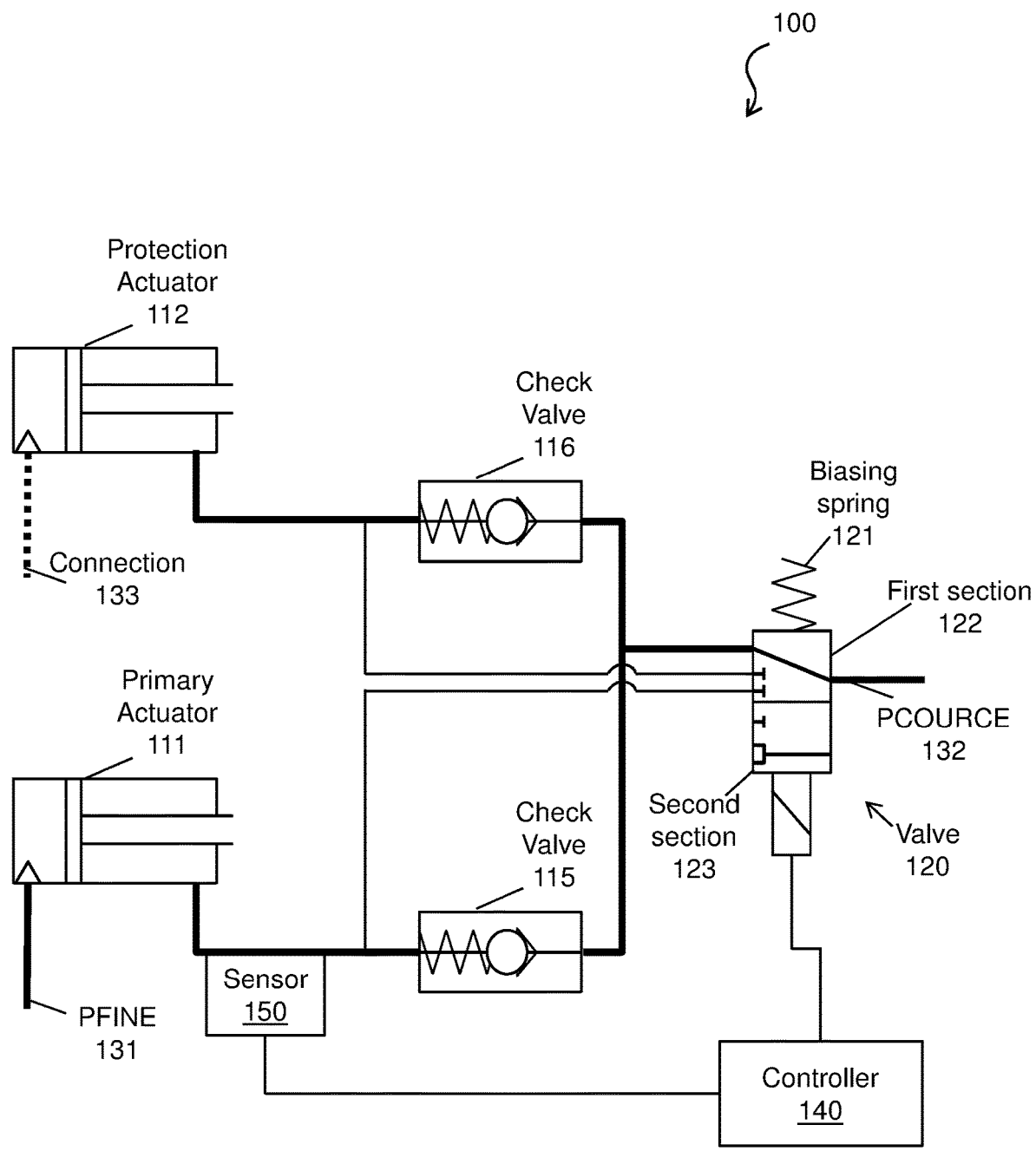
FIG. 1 depicts a dual actuator hydraulic pitch-lock propeller system according one or more embodiments.

FIG. 1 depicts a dual actuator hydraulic pitch-lock propeller system 100 (herein referred to as a system 100) according one or more embodiments. The system 100 includes a dual piston actuator (e.g., a primary actuator 111 and a protection actuator 112). The system 100 also includes at least three valves, such as two increase pitch check valves 115 and 116 and a valve 120. The system 100 can be incorporated into any rotating hardware of an aircraft, such as with respect to variable pitch propellers, on a rotating side of the propellers. Note that elements of the system 100 can also be mounted remotely on a stationary side of the propellers, such as the valve 120.

The system 100 operates between a first mode and a protection mode. The first mode results in a normal operation of the propellers. The protection mode results in a hydraulic pitch-lock condition with a capability to increase pitch should a hydraulic control pressure be available. The protection mode is the state of the system 100 being shown in FIG. 1.

The primary actuator 111 and the protection actuator 112 can be any type of component that is responsible for moving and controlling a mechanism or system (e.g., propeller blades). The primary and protection actuators 111 and 112 can be operated by hydraulic fluid or pneumatic pressure. In accordance with one or more embodiments, the system receives/provides at least two mediums, such as hydraulic fluid and/or engine oil (e.g., PFINE 131 and PCOURCE 132), via one or more channels, piping, lines, ducts, or the like. The primary and protection actuators 111 and 112 operate in a similar manner, where an internal piston is driven in either direction based on the application of the at least two mediums (to increase and decrease a pitch of the propellers of the aircraft).

In accordance with one or more embodiments, a first medium is PFINE 131, which can be a hydraulic force used to decrease pitch of the propeller blades. Further, a second medium is PCOURCE 132, which can be a hydraulic force used to increase pitch of the propeller blades (e.g., increasing pitch puts the propellers in a low drag configuration). Further, the connection 133 can provide atmospheric pressure or connect to PFINE 131.

The check valves 115 and 116 can be any type of valve that closes to prevent backward flow of a medium (e.g., a hydraulic fluid and/or an engine oi). The check valves 115 and 116, in operation, allow an increase in pitch by stabilizing an amount of PCOURCE 132 provided to each of the primary and protection actuators 111 and 112 (e.g., preventing any decrease in pitch).

The valve 120 can be any type of inductor/electromagnet/solenoid operated valve, the purpose of which is to generate a controlled magnetic field. The valve 120 can include a biasing spring 121, which ensures that the protection mode is selected in case of power loss. The valve 120 can include a first section 122 and a second section 123. The first section 122 is related to the protection mode, such that PCOURCE 132 is provided through the check valves 115 and 116 to the primary and protection actuators 111 and 112 when the first section 122 is selected. The second section 123 is related to the first mode, such that PCOURCE 132 is provided directly to the primary and protection actuators 111 and 112 when the second section 123 is selected. Thus, the second section 123 is in position for providing PCOURCE 132 directly to the primary and protection actuators 111 and 112 when the controlled magnetic field is operational. Further, the biasing spring 121 drives the first section 122 into position for providing PCOURCE 132 through the check valves 115 and 116 when the controlled magnetic field is gone due to a loss of power. In accordance with one or more embodiments, the valve 120 utilizes an additional hydraulic line to the rotating side as a selection force to counteract the bias spring 121 and position the valve 120.

The system 100 can includes a controller 140 and at least one sensor 150. The controller 140 can be an electronic, computer framework comprising and/or employing any number and combination of computing device and networks utilizing various communication technologies, as described herein. The controller 140 can be easily scalable, extensible, and modular, with the ability to change to different services or reconfigure some features independently of others. The controller 140 has a processor, also referred to as a processing circuit, microprocessor, computing unit, which is coupled via a system bus to a system memory and various other components. In accordance with one or more embodiments, the controller 140 can be, for example, programmable logic circuitry, field-programmable gate arrays (FPGA), or programmable logic arrays (PLA) that may execute computer readable program instructions by utilizing state information of the computer readable program instructions to personalize the electronic circuitry, in order to perform operations (such as those described with respect to FIG. 2).

The sensor 150 can be any transducer that converts an environmental condition (e.g., pressure) to an electoral signal. In accordance with one or more embodiments, the system 100 can utilize a single sensor (as shown in FIG. 1) to minimize a complexity of the primary and protection actuators 111 and 112. The sensor 150 can monitor the dual piston actuator (e.g., the primary actuator 111 and the protection actuator 112) to ensure adequate latent fault detection (e.g., control loss detection). Control loss detection can also be identified via an actuator position feedback (if pitch position is not following a command) via pulse targets, transfer tube rotary variable differential transformer, or the like.

In accordance with one or more embodiments, the controller 140 can operate the valve 120 based on signals from the sensor 130 (e.g., along with pulse targets, transfer tube rotary variable differential transformer, or the like), such as by electrically disabling or turning off the controlled magnetic field of the valve 120. The controlled magnetic field provides a force that acts on the third valve 120. In this regard, the protection actuator 111 can increase pitch and rely upon aerodynamic loads toward flat pitch for its counterbalancing force based on the sensor 150. Further, due to the biasing spring 121, if the controller 140, the sensor 150, and/or the valve 120 loss power, the valve 120 defaults to the protection mode.

Figure 2:
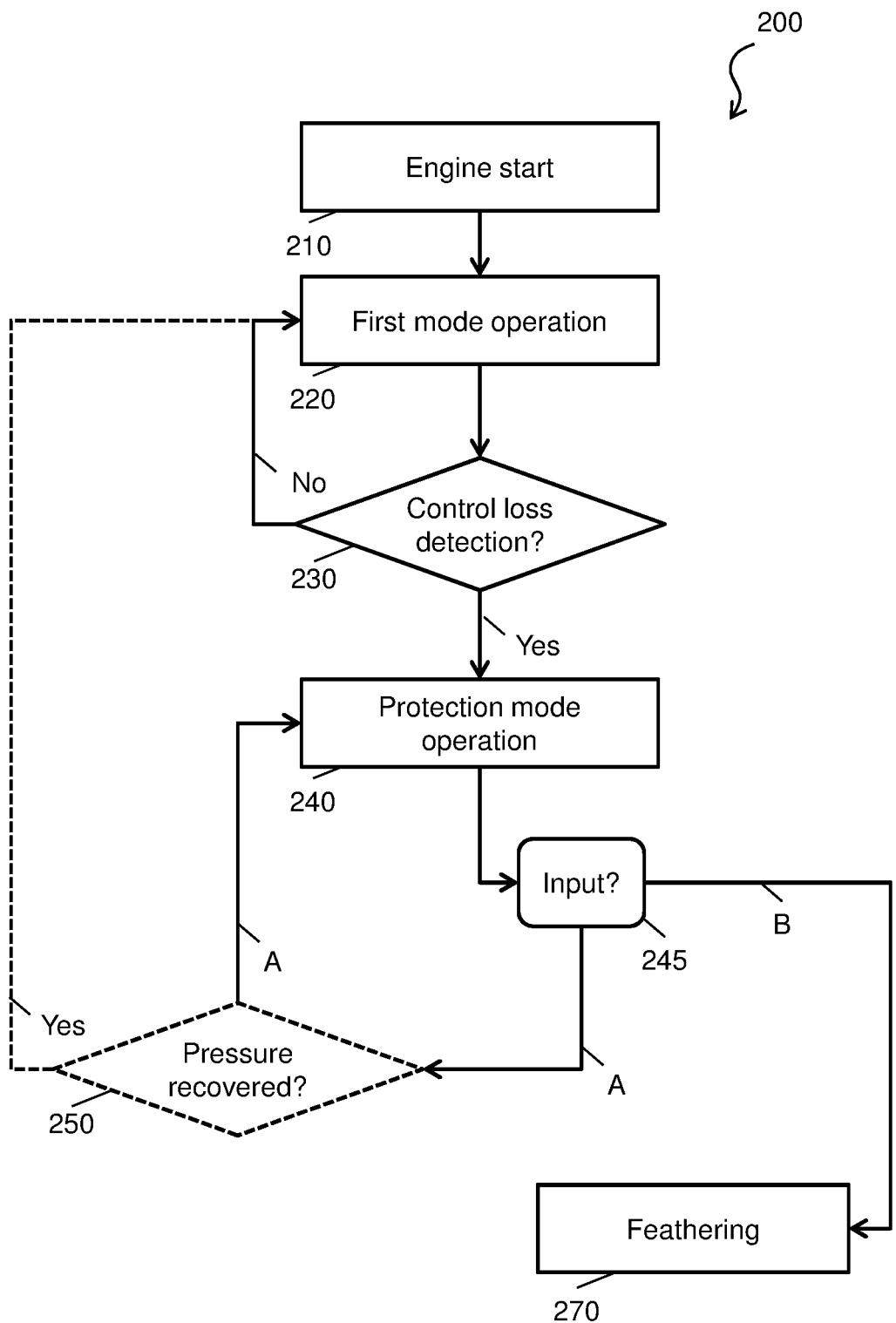
FIG. 2 depicts a process flow illustrating an example operation of a dual actuator hydraulic pitch-lock propeller system according one or more embodiments.

FIG. 2 depicts a process flow 200 illustrating an example operation of a dual actuator hydraulic pitch-lock propeller system 100 according one or more embodiments. The process flow 200 begins at block 210, where an engine start is performed. An engine start can include a built in test to decrease pitch and verify integrity of the system 100. Note that the built in test can be performed in a protection mode momentarily to ensure a pressure developed is within a normal range expected. With a successful engine start (and an expected pressure is reached), the process flow 200 proceeds to block 220.

At block 220, the system 100 operates in a first mode. The first mode results in the normal operation of the propellers. For instance, the second section 123 of the valve 120 is positioned such that PCOURCE 132 is provided directly to the primary and protection actuators 111 and 112. Next, at decision block 230, the system 100 determines whether a control loss is detected. Control loss includes when a PCOURCE 132 is operating outside of expectations, whether do to an increase or decrease of pressure (e.g., hydraulic pressure is lost). As discussed herein, a control loss can be detected by the monitoring of the sensor 150 or if a pitch position is not following a command. Further, the control loss can include when a loss of power occurs. If no control loss is detected, the process flow 200 returns to block 220 (as indicated by the No arrow). If the control loss is detected, the process flow 200 proceeds to block 240 (as indicated by the Yes arrow).

At block 240, the system 100 operates in a protection mode. In this regard, a command can be sent to the valve 120 enter the protection mode, which will cause the primary and protection actuators 111 and 112 to hold pitch (e.g., at a minimum inflight angle) due to the check valve 115 and 116 and only allow an increase in the pitch due.

At block 245 the system 100 can receive an input. For instance, the controller 140 can receive an input from a pilot of an aircraft. The input can direct the system 100 to continue operating in the protection mode. In this case, the process flow 200 proceeds to block 240 (as indicated by A arrows). Note that if no input is received, the system 100 can default to continue operating in the protection mode. Optionally, while under the protection mode, the system 100 can perform a pressure recover check (as shown by block 250). That is, if the control loss is still detected, then the process flow 200 proceeds to block 240 and the system 100 remains in the protection mode. However, if pressure has recovered, as detected by the sensor 150, then the system 100 can return to the first mode of operation. In this case, the process flow 200 proceeds to block 220 (as indicated by Yes arrow).

Returning to block 245, if the input directs the system 100 to feather, then the process flow 200 proceeds to block 270 (as indicated by the B arrow). At block 270, feathering the propellers is performed. That is, a hydraulic flow is increased to increase pitch to decrease the drag (e.g., high pitch low drag configuration).

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    a dual piston actuator comprising a primary actuator and a protection actuator,
    wherein the primary and protection actuators move to increase and decrease a pitch of propellers of an aircraft with respect to a supply of first and second mediums; and
    a plurality of valves comprising a first check valve, a second check valve, and a third valve,
    wherein the third valve, based on a signal from a sensor, operates between a first mode and a protection mode, wherein when operating in the first mode, the second medium is sent directly to the primary and protection actuators without passing through the first and second check valves, respectively, wherein when operating in the protection mode, the second medium is directed to the primary and protection actuators through the first and second check valves, respectively.

2. The system of claim 1, wherein the protection mode comprises a hydraulic pitch-lock condition with a capability to increase the pitch of the propellers.

3. The system of claim 1, wherein the first medium comprises a hydraulic force used to decrease the pitch of the propellers.

4. The system of claim 1, wherein the second medium comprises a hydraulic force used to increase the pitch of the propellers.

5. The system of claim 1, wherein a connection of the protection actuator receives atmospheric pressure or the first medium.

6. The system of claim 1, wherein the third valve comprises a solenoid operated valve that generates a controlled magnetic field that provides a force acting on the third valve.

7. The system of claim 1, wherein the third valve comprises a biasing spring that selects that the protection mode during a power loss.

8. The system of claim 1, wherein the sensor monitors the dual piston actuator for latent fault detection.

9. The system of claim 1, wherein the system is incorporated into a rotating side of the propellers of the aircraft.

10. A method comprising:
    operating a dual piston actuator in a first mode, the dual piston actuator comprising a primary actuator and a protection actuator that move to increase and decrease a pitch of propellers of an aircraft with respect to a supply of first and second mediums without the first and second mediums moving through a first check valve or a second check valve;
    detecting a control loss with respect to the second medium and a third valve switching between operating in the first mode and the protection mode based on the control loss,
    wherein, when operating the dual piston actuator in the protection mode, the second medium is directed to the primary and protection actuators through the first and second check valves.

11. The method of claim 10, wherein a sensor monitors the dual piston actuator for the control loss.

12. The method of claim 10, wherein the protection mode comprises a hydraulic pitch-lock condition with a capability to increase the pitch of the propellers of the aircraft.

13. The method of claim 10, wherein the primary and protection actuators control the propellers of the aircraft in accordance with the supply of the first and second mediums and the first medium comprises a hydraulic force used to decrease the pitch of the propellers.

14. The method of claim 10, wherein the primary and protection actuators control the propellers of the aircraft in accordance with the supply of the first and second mediums and the second medium comprises a hydraulic force used to increase the pitch of the propellers.

15. The method of claim 10, wherein the third valve comprises a solenoid operated valve that generates a controlled magnetic field that provides a force acting on the third valve.

16. The method of claim 10, wherein the third valve comprises a biasing spring that selects that the protection mode during a power loss.

\* \* \* \* \*